(12) United States Patent (10) Patent No.: US 8,355,905 B2
Fokoue-Nkoutche et al. (45) Date of Patent: Jan. 15, 2013

(54) MAPPING OF RELATIONSHIP ENTITIES BETWEEN ONTOLOGIES

(75) Inventors: Achille B. Fokoue-Nkoutche, White Plains, NY (US); Aditya A. Kalyanpur, Westwood, NJ (US); Kirill M. Osipov, Ossining, NY (US); Kavitha Srinivas, Rye, NY (US); Min Wang, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 12/780,663

(22) Filed: May 14, 2010

(65) Prior Publication Data

US 2011/0282652 A1 Nov. 17, 2011

(51) Int. Cl.
*G06F 17/27* (2006.01)
*G06F 17/20* (2006.01)
*G06F 17/21* (2006.01)

(52) U.S. Cl. .................................. 704/9; 704/1; 704/10
(58) Field of Classification Search .................. 704/1, 9, 704/10; 707/E17.098, 99; 706/45, 47
See application file for complete search history.

(56) References Cited

U.S. PATENT DOCUMENTS

| | | | |
|---|---|---|---|
| 6,826,568 B2 | 11/2004 | Bernstein et al. | |
| 7,225,183 B2 | 5/2007 | Gardner | |
| 7,472,137 B2 | 12/2008 | Edelstein et al. | |
| 7,475,084 B2 | 1/2009 | Edelstein et al. | |
| 7,673,282 B2 * | 3/2010 | Amaru et al. | 717/104 |
| 2004/0117346 A1 * | 6/2004 | Stoffel et al. | 707/1 |
| 2004/0260576 A1 * | 12/2004 | Wang et al. | 705/2 |
| 2005/0091076 A1 * | 4/2005 | McGovern | 705/1 |
| 2007/0150495 A1 * | 6/2007 | Koizumi et al. | 707/100 |
| 2007/0198448 A1 | 8/2007 | Fokoue-Nkoutche et al. | |
| 2008/0065578 A1 | 3/2008 | Fokoue-Nkoutche et al. | |
| 2008/0071731 A1 * | 3/2008 | Ma et al. | 707/2 |
| 2009/0100090 A1 | 4/2009 | Lee et al. | |
| 2010/0049766 A1 * | 2/2010 | Sweeney et al. | 707/737 |

FOREIGN PATENT DOCUMENTS

WO 2009103776 A2 8/2009

OTHER PUBLICATIONS

Myroshnichenko-et al.; "Mapping ER Schemas to OWL Ontologies"; DIALOG/INSPEC/EI COMPENDEX; Sep. 2009.
Qi Xiong-et al.; "A Seachable Knowledge Map Based on Ontology"; INSPEC/IEEE; 2008.

(Continued)

*Primary Examiner* — Jesse Pullias
(74) *Attorney, Agent, or Firm* — Mollborn Patents, Inc.; Fredrik Mollborn

(57) ABSTRACT

Methods, apparatus and systems, including computer program products, for reducing an error rate when mapping entities between a first ontology and a second ontology. One or more of a general language dictionary and an industry-specific dictionary are provided. Natural language processing of the first ontology is performed to identify one or more candidate relationship entities in the first ontology. Each candidate relationship entity includes a compound name having two or more semantic labels, and each candidate relationship entity has a name that neither exists in the general language dictionary or the industry-specific dictionary. Each of the one or more candidate relationship entities in the first ontology is mapped to one or more entities in the second ontology using one or more configurable computer-implemented mapping algorithms.

17 Claims, 3 Drawing Sheets

OTHER PUBLICATIONS

Storey, VC.; "Comparing Relationships in Conceptual Modeling: Mapping to Semantic Classifications"; INSPEC/IEEE; Nov. 2005.
Giuliano-et al.; "Relation Extraction and the Influence of Automatic Named-Entity Recognition"; ACM Digital Library; vol. 5 No. 1, Article 2, Dec. 2007.
Malik-et al.; "RATEWeb: Reputation Assessment for Trust Establishment among Web Services"; ACM Digital Library; 2009.
Li-et al.; "Web Services Provision: Solutions, Challenges, and Opportunities"; ACM Digital Library; Jan. 2009.

* cited by examiner

MAPPING OF RELATIONSHIP ENTITIES BETWEEN ONTOLOGIES

BACKGROUND

The present invention relates to methods and tools for mapping between ontologies in computer systems. Software development increasingly depends on industry standards, ontologies and various industry models. However, development productivity is often impeded by a lack of mapping or alignment between different industry-specific models. For example, a company may have a legacy, proprietary banking ontology, which is substantially different from a provider's banking ontology, such as, for example the Industry Framework (IFW) ontology for banking, provided by International Business Machines Inc. of Armonk, N.Y.

There are automated industry mapping tools for generating an alignment between different ontologies. For example a mapping which indicates that the terms "Order" and "Purchase," respectively, represent the same entities in two different ontologies. However, these automated mapping tools often have a high error rate, which can lead to decreased productivity and increasing development costs. A significant percentage of such errors relate to model entities that do not conform to regular naming conventions. For example, instead of using an entity "Customer" that has an association labeled "has" to an entity "Order", a source industry model may use an entity "CustomerOrder." Such an entity can be referred to as a "relationship entity".

Relationship entities may cause errors in the mapping process because the documentation for a relationship entity often refers to both the entities that participate in the relationship. For example, when mapping a source industry model that includes a "CustomerOrder" relationship entity, the industry mapping tool may incorrectly map "CustomerOrder" to "Customer" or to "Order" in the destination industry model when, in fact, "CustomerOrder" should not be mapped to either of these entities. In this example, the error is caused by the industry mapping tool incorrectly relying on "customer" and "order" keywords in the documentation of the "CustomerOrder" relationship entity. Many other similar examples exist. Thus, it would be beneficial to find a solution that eliminates or reduces such problems.

SUMMARY

In one aspect, the various embodiments of the invention provide methods, apparatus and systems, including computer program products, for reducing an error rate when mapping entities between a first ontology and a second ontology. One or more of a general language dictionary and an industry-specific dictionary are provided. Natural language processing of the first ontology is performed to identify one or more candidate relationship entities in the first ontology. Each candidate relationship entity includes a compound name having two or more semantic labels, and each candidate relationship entity has a name that neither exists in the general language dictionary or the industry-specific dictionary. Each of the one or more candidate relationship entities in the first ontology is mapped to one or more entities in the second ontology using one or more configurable computer-implemented mapping algorithms.

Various embodiments of the invention can include one or more of the following advantages. The error rate of industry mapping tools can be reduced, thus resulting in an increased productivity for companies and corporations using the mapping tools in accordance with various embodiments of the invention. The industry mapping tools in accordance with the various embodiments can be applied to intercompany e-commerce transactions, in which each company has a proprietary ontology. For example, a company can express data in its own ontology, apply the industry mapping tool to convert data to be in terms of another company's ontology and then perform a transaction using the converted data. This leads to a reduction in error rates, which in turn results in cost savings for intercompany e-commerce transactions.

The details of one or more embodiments of the invention are set forth in the accompanying drawings and the description below. Other features and advantages of the invention will be apparent from the description and drawings, and from the claims.

BRIEF DESCRIPTION OF THE SEVERAL VIEWS OF THE DRAWINGS

Like reference symbols in the various drawings indicate like elements.

DETAILED DESCRIPTION

Figure 1:
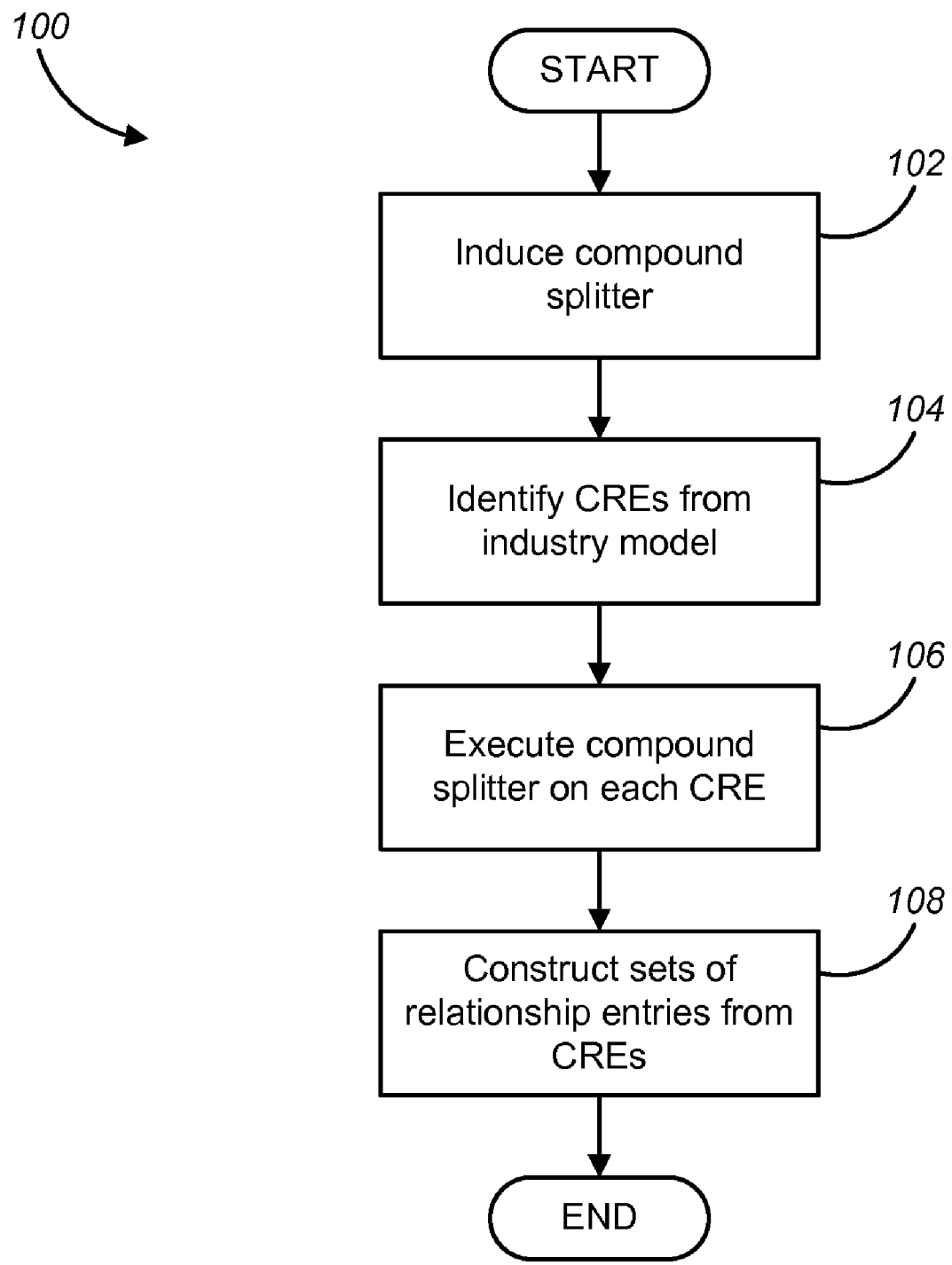
FIG. 1 shows a process (100) for detection of relationship entities in an industry model using a compound splitter and an industry specific dictionary, in accordance with one embodiment.

In general, various embodiments of the invention pertain to industry model mapping tools that rely on natural language processing and machine learning algorithms to process a textual part of industry models (e.g., entity names, documentation, etc.) and to learn to generate mappings. More specifically, the various embodiments relate to methods and apparatus, including computer program products, for detection of relationship entities in an industry model using a compound splitter and an industry specific dictionary. Compound splitters are familiar to those of ordinary skill in the art and solve a common problem in information retrieval. For example, in some languages, such as German, several words are often concatenated into a string and it is necessary to somehow split the string into smaller pieces to identify the individual terms (also referred to as "semantic labels") that may be needed in the information retrieval. As the skilled person realizes, there may be many ways in which a compound string can be split. One way to identify the proper way to split the string is to first identify all valid combinations of words that can be generated from the compound string, and then rank the likelihood of any given combination being the "correct" one. The ranking can be done, for example, based on the combined probability of the component words occurring in English. The industry specific dictionary can in some embodiments be as simple as a lexicon, that is, an alphabetical list of the words in a language or the words associated with a particular subject. In other embodiments, the industry specific dictionary can be a superset of a lexicon, that is, a true dictionary with word definitions.

Various embodiments also relate to methods and apparatus, including computer program products for improved error rate in an industry mapping tool by automated, configurable algorithms for handling relationship entities during industry mapping processes. The various embodiments of the invention reduce the error rate of the industry mapping tool by detecting relationship entities during the Natural Language Processing (NLP) phase of the tools and choosing an optimal algorithm for handling a specific relationship entity.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference to FIG. 1, a process (100) for detecting relationship entries in an industry model using a compound splitter and an industry specific dictionary in accordance with one embodiment will now be described. For purposes of explanation, it is assumed that there is a given industry model, a language corpus (or a language dictionary) and one or more optional industry-specific dictionaries. For example, a simple example of an industry-specific dictionary for the area of retail banking can include terms such as "checking," "savings," "money market," etc. As can be seen in FIG. 1, the process (100) starts by inducing a compound splitter using either a general language dictionary or an industry specific dictionary (step 102). As is well-known to those of ordinary skill in the NLP area, in this context "inducing a compound splitter" means to use data to configure (or provide parameters to) a compound splitting algorithm. Next, candidate relationship entities (CREs) are identified from the industry model by identifying entities having names that neither exist in the general dictionary, nor in the industry-specific dictionary. For example, as was mentioned above, one such entity is a "CustomerOrder" entity.

Once the CREs have been identified, the compound splitter is executed on each CRE to associate the identified CREs with N entity names generated by the compound splitter. For example, executing the compound splitter on a CRE, such as "CustomerOrder," results in N=2 entity names, that is "Customer" and "Order." Finally, a set of relationship entities are constructed from the CREs (step 108). In one embodiment, the relationship entities are constructed by selecting CREs based on following criteria:

$N \geq 2$; and each of the N CRE names must match an entity name in the industry model.

Figure 2:
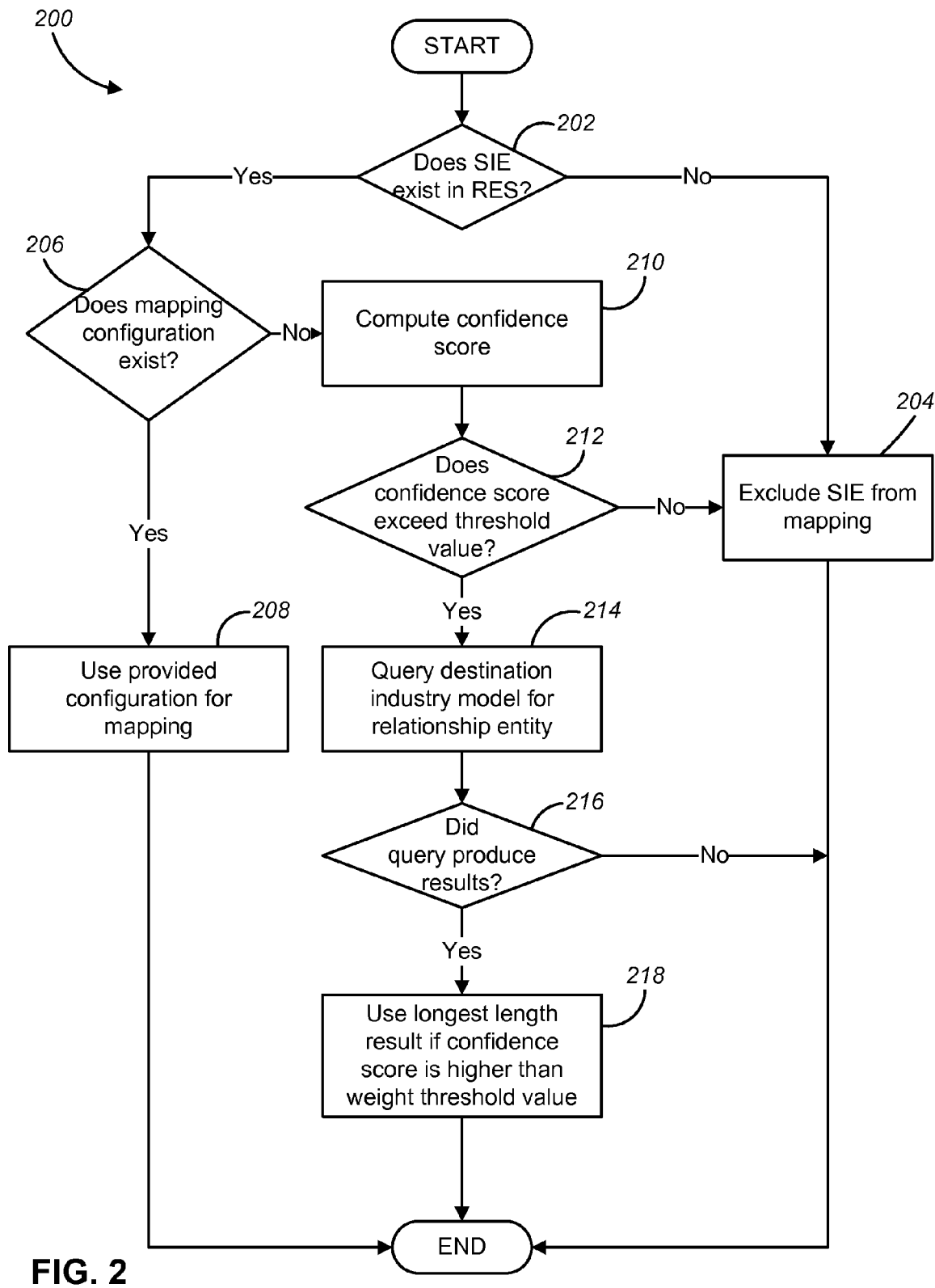
FIG. 2 shows a process (200) for reducing the error rate in an industry mapping tool, in accordance with one embodiment.

With reference now to FIG. 2, a process (200) will now be described for reducing the error rate in an industry mapping tool during mapping of a source industry entity (SIE) to a destination industry entity through the use of an automated, configurable algorithm for handling relationship entities during an industry mapping process, in accordance with one embodiment. For purposes of explanation, it is assumed herein that there is an industry mapping set, that is, a set including a SIE, a destination industry entity and confidence score triples, a set of relationship entities, configuration parameters (which will be described in further detail below), and an optional configuration specifying mapping target for a relationship entity. An example of a confidence score triple can be "CustomerOrder", "ClientPurchase" and "0.99", meaning that with a 0.99 confidence score, the "CustomerOrder" in the source ontology maps to "ClientPurchase" in the destination ontology. An example of an optional configuration can be a predefined set of rules, for example, to tell the algorithm to always map "CustomerOrder" to "ClientPurchase."

As can be seen in FIG. 2, the process (200) starts by determining whether the SIE exists in the relationship entity set (RES) (step 202). If it is determined that there is no SIE, then the SIE is excluded from mapping (step 204) and the process (200) ends. If it is determined in step 202 that a SIE exists in the RES, then the process checks whether a configuration is provided that defines the mapping of the SIE to one or more entities in the destination industry model (step 206). If such a configuration exists, then the configuration is used for the mapping (step 208) and the process (200) ends. However, if it is determined in step 206 that no configuration exists, a confidence score is determined for mapping each of the N entity names computed by the compound splitter for the SIE to the destination industry model (step 210). For example, in one embodiment a confidence score can be determined as follows. Consider mapping "CustomerOrderLineitem" in the source model to either "ClientPurchaseItem" or to "ClientPurchase" entities in the destination model. The mapping of "CustomerOrderLineitem" to "ClientPurchaseItem" yields a higher confidence score than the mapping of "CustomerOrderLineitem" to "ClientPurchase," because the mapping tool determined that "Customer" maps to "Client," "Purchase" maps to "Order" and "Lineitem" maps to "Item."

The process then checks whether the computed confidence score exceeds a specified threshold value (step 212). The threshold value can be specified as part of the configurations process. In some embodiments a threshold value of 0.95 is used, that is, the process requires more than 95% confidence. But of course these threshold values can vary depending on the particular circumstances and embodiments. If the confidence score does not exceed the threshold value, the process continues to step 204, where the SIE is excluded from the mapping, as described above.

If it is determined in step 212 that the confidence score does indeed exceed the threshold value, then the destination industry model is queried for a relationship entity set with an entity name based on the mapping of each of the subsets of N SIE entity names (step 214), and it is determined whether any results were produced from the query (step 216). If no results were produced, the process ends. If the query produced results, then the result with the longest length, with each mapping weighted by the confidence score for the mapping is used as a new mapping in the industry mapping set (step 218) if the confidence score exceeds a specified weight threshold value and the process (200) ends.

Determining the longest length can be explained by again considering the mapping of "CustomerOrderLineitem" to either "ClientPurchaseItem" or to "ClientPurchase." Mapping "CustomerOrderLineitem" to "ClientPurchaseItem" yields a length of 3, since "Customer," "Order," and "Lineitem" are mapped, where as mapping "CustomerOrderLineitem" to "ClientPurchase" only yields a length of 2. The weighting can be based on weights generated by the industry mapping tool. For example, the tool may have determined that mapping "Lineitem" to "Item" has a very low weight (or confidence), say 0.2. If 0.2 is below the weight threshold value, this means that the process (200) should not rely on the mapping of "Lineitem" to "Item" and instead just map "CustomerOrderLineitem" to "ClientPurchase". Again, as the skilled person realizes, of course different weight threshold values etc. can be set based on the particular circumstances.

Figure 3:
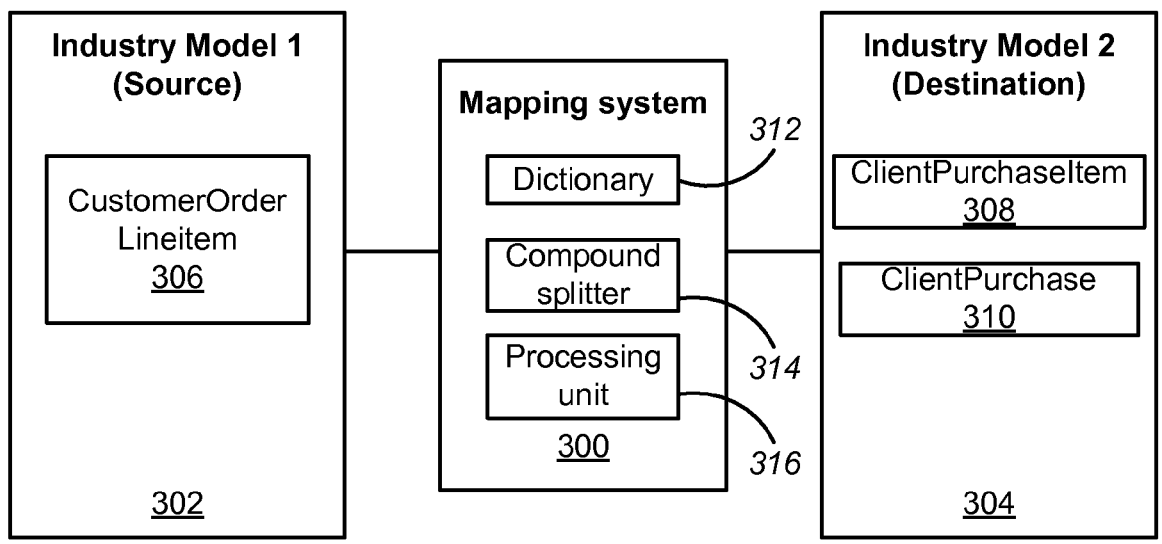
FIG. 3 shows a system (300) for mapping relationship entities between a first and a second industry model, in accordance with one embodiment.

FIG. 3 shows a mapping system (300) for mapping relationship entities in a source industry model (302) to relationship entities in a destination industry model (304). The various components of the system (300) will only be briefly described here, as a detailed explanation of their functionality has been provided above. The source industry model (302) includes a number of relationship entities (306), such as the "CustomerOrderLineitem" discussed above. The destination industry model (304) also includes a number of relationship entities (308; 310), such as the "ClientPurchaseItem" and the "ClientPurchase," also discussed above.

The mapping system (300) includes a dictionary (312), which can be a general or an industry specific dictionary. The dictionary is used to induce a compound splitter (314) to split strings of concatenated words into their individual components and then ranking the likelihood of the various components to be the correct ones (i.e., ensuring that a proper split of the string of concatenated words has been made).

A processing unit (316) controls the activities of the compound splitter (314) and performs the operations described above with respect to FIGS. 1 and 2. That is, the processing unit (316) identifies the CREs and constructs REs, based on specific criteria and using confidence scores and threshold values etc. The processing unit (316) produces a mapping that is more accurate than conventional automated industry mapping tools and can be used, for example, by various types of software application that rely on information transfer or comparisons between relationship entities in disparate industry models.

It should be realized that the mapping system (300) can take the form of an entirely hardware embodiment, an entirely software embodiment (including firmware, resident software, micro-code, etc.) or an embodiment combining software and hardware aspects. The mapping system (300) can also take the form of a computer program product embodied in any tangible medium of expression having computer-usable program code embodied in the medium. Furthermore, even though the dictionary (312) and the compound splitter (314) have been illustrated in FIG. 3 as being part of the mapping system (300), they can also be fully or partly external to the mapping system (300), i.e., located on a remote computer or server, and communicate with the processing unit (316) through any type of network, such as a local area network (LAN) or a wide area network (WAN), for example.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for reducing an error rate when mapping entities between a first ontology and a second ontology, comprising:
    providing one or more of a general language dictionary and an industry-specific dictionary;
    performing natural language processing of the first ontology to identify one or more candidate relationship entities in the first ontology, wherein each candidate relationship entity comprises a compound name including two or more semantic labels, and wherein each candidate relationship entity has a name that neither exists in the general language dictionary or the industry-specific dictionary, wherein the natural language processing includes:
        inducing a compound splitter using one or more of the general language dictionary and the industry-specific dictionary;
        executing the compound splitter on each of the identified candidate relationship entities to associate each candidate relationship entity with a number of entity names generated by the compound splitter; and
        generating a set of relationship entities from the candidate relationship entities based on results from executing the compound splitter; and
    mapping each of the one or more candidate relationship entities in the first ontology to one or more entities in the second ontology using one or more configurable computer-implemented mapping algorithms.

2. The method of claim 1, wherein generating the set of relationship entities comprises:
    selecting candidate relationship entities that have two or more entity names generated by the compound splitter and wherein each of the two or more entity names matches an entity name in the first ontology.

3. The method of claim 2, wherein mapping each of the one or more candidate relationship entities in the first ontology to one or more entities in the second ontology further comprises:
    generating an initial mapping set between a plurality of entities in the first ontology and a plurality of entities in the second ontology; and
    using the initial mapping set when mapping each of the one or more relationship entities in the first ontology to one or more entities in the second ontology.

4. The method of claim 3, further comprising:
    ranking the one or more relationship entities in the first ontology based on a likelihood for the one or more relationship entities to be correctly mapped to the second ontology.

5. The method of claim 4, wherein ranking the one or more relationship entities comprises:
    determining a confidence score for mapping the entity names generated by the compound splitter to the second ontology.

6. The method of claim 5, further comprising:
    determining whether the confidence score exceeds a threshold value.

7. The method of claim 1, wherein the first and second ontologies represent industry models.

8. A computer program product for reducing an error rate when mapping entities between a first ontology and a second ontology, the computer program product comprising:
    a non-transitory computer usable storage medium having computer usable program code embodied therewith, the computer usable program code comprising:
    computer usable program code configured to provide one or more of a general language dictionary and an industry-specific dictionary;
    computer usable program code configured to perform natural language processing of the first ontology to identify one or more candidate relationship entities in the first ontology, wherein each candidate relationship entity comprises a compound name including two or more semantic labels, and wherein each candidate relationship entity has a name that neither exists in the general language dictionary or the industry-specific dictionary, wherein the computer usable program code configured to perform natural language processing includes:
        computer usable program code configured to induce a compound splitter using one or more of the general language dictionary and the industry-specific dictionary;
        computer usable program code configured to execute the compound splitter on each of the identified candidate relationship entities to associate each candidate relationship entity with a number of entity names generated by the compound splitter; and
        computer usable program code configured to generate a set of relationship entities from the candidate relationship entities based on results from executing the compound splitter; and
    computer usable program code configured to map each of the one or more candidate relationship entities in the first ontology to one or more entities in the second ontology using one or more configurable computer-implemented mapping algorithms.

9. The computer program product of claim 8, wherein the computer usable program code configured to generate the set of relationship entities comprises:
    computer usable program code configured to select candidate relationship entities that have two or more entity names generated by the compound splitter and wherein each of the two or more entity names matches an entity name in the first ontology.

10. The computer program product of claim 9, wherein the computer usable program code configured to map each of the one or more candidate relationship entities in the first ontology to one or more entities in the second ontology further comprises:
   computer usable program code configured to generate an initial mapping set between a plurality of entities in the first ontology and a plurality of entities in the second ontology; and
   computer usable program code configured to use the initial mapping set when mapping each of the one or more relationship entities in the first ontology to one or more entities in the second ontology.

11. The computer program product of claim 10, further comprising:
   computer usable program code configured to rank the one or more relationship entities in the first ontology based on a likelihood for the one or more relationship entities to be correctly mapped to the second ontology.

12. The computer program product of claim 11, wherein the computer usable program code configured to rank the one or more relationship entities comprises:
   computer usable program code configured to determine a confidence score for mapping the entity names generated by the compound splitter to the second ontology.

13. The computer program product of claim 12, further comprising:
   computer usable program code configured to determine whether the confidence score exceeds a threshold value.

14. The computer program product of claim 8, wherein the first and second ontologies represent industry models.

15. A mapping system for reducing an error rate when mapping entities between a first ontology and a second ontology, comprising:
   a dictionary, the dictionary being a general language dictionary or an industry-specific dictionary;
   a compound splitter; and
   a processing unit, the processing unit being operable to:
      perform natural language processing of the first ontology to identify one or more candidate relationship entities in the first ontology, wherein each candidate relationship entity comprises a compound name including two or more semantic labels, and wherein each candidate relationship entity has a name that does not exist in the dictionary,
   wherein the natural language processing includes:
      inducing the compound splitter using the dictionary;
      executing the compound splitter on each of the identified candidate relationship entities to associate each candidate relationship entity with a number of entity names generated by the compound splitter;
      generating a set of relationship entities from the candidate relationship entities based on results from executing the compound splitter; and
   map each of the one or more candidate relationship entities in the first ontology to one or more entities in the second ontology using one or more configurable computer-implemented mapping algorithms.

16. The system of claim 15, wherein the processing unit is operable to generate the set of relationship entities by:
   selecting candidate relationship entities that have two or more entity names generated by the compound splitter and wherein each of the two or more entity names matches an entity name in the first ontology.

17. The system of claim 15, wherein the first and second ontologies represent industry models.

* * * * *